(12) United States Patent
Enna et al.

(10) Patent No.: US 7,978,722 B2
(45) Date of Patent: Jul. 12, 2011

(54) HOST DIGITAL TERMINAL TOOLS FOR VOICEPORT REDISTRIBUTIONS

(75) Inventors: Robert Enna, Aliso Viejo, CA (US); Timothy Chia, Irvine, CA (US)

(73) Assignee: Cox Communications, Inc., Atlanta, GA (US)

( * ) Notice: Subject to any disclaimer, the term of this patent is extended or adjusted under 35 U.S.C. 154(b) by 1094 days.

(21) Appl. No.: 11/217,224

(22) Filed: Sep. 1, 2005

(65) Prior Publication Data

US 2006/0168232 A1 Jul. 27, 2006

Related U.S. Application Data

(60) Provisional application No. 60/629,739, filed on Nov. 19, 2004.

(51) Int. Cl.
*H04L 12/28* (2006.01)
(52) U.S. Cl. .................................. 370/420; 709/221
(58) Field of Classification Search .................. 717/100, 717/104, 105, 124, 125
See application file for complete search history.

(56) References Cited

U.S. PATENT DOCUMENTS 5,559,955 A * 9/1996 Dev et al. ........................... 714/4
6,279,158 B1 * 8/2001 Geile et al. ..................... 725/126
6,292,651 B1 * 9/2001 Dapper et al. ................. 725/106

* cited by examiner

*Primary Examiner* — Kwang B Yao
*Assistant Examiner* — Alex Skripnikov
(74) *Attorney, Agent, or Firm* — Merchant & Gould

(57) ABSTRACT

Communication capacity of a node served by a host digital terminal is managed by redistributing communication lines among headend modems for the node in the host digital terminal. Each node has a plurality of communication lines connected to one or more headend modems, and the communication lines are distributed among one or more voiceports. A voiceport list build module is responsive to a line distribution input for headend modems connected to the node served by the host digital terminal. The voiceport list build module builds a voiceport redistribution list for redistributing the communication lines connected to the headend modems for the node. A voiceport redistribution module is responsive to the voiceport redistribution list and moves one or more voiceports from the voiceport's current headend modem to another headend modem whereby the communication lines for the node are redistributed among headend modems communicating with the node.

14 Claims, 7 Drawing Sheets

REDISTRIBUTE NODE SCREEN

FIG. 3

HOST DIGITAL TERMINAL TOOLS FOR VOICEPORT REDISTRIBUTIONS

CROSS-REFERENCE TO RELATED APPLICATIONS

This application claims the benefit of provisional U.S. patent application No. 60/629,739, filed Nov. 19, 2004, and which is expressly incorporated herein, in its entirety, by reference.

FIELD OF THE INVENTION

This invention relates to host digital terminal tools. More particularly the invention relates to host digital terminal tools that assist the redistribution of voiceports on headend modems managed by the host digital terminal.

BACKGROUND OF THE INVENTION

A host digital terminal (HDT) manages multiple headend modems, and each headend modem (HEM) handles a large number of voiceports over radio frequency channels. For example, there may be 28 headend modems managed by each host digital terminal and each headend modem may handle 120 voiceports. The host digital terminal is in turn connected through communication links to switches in a larger telecommunications network.

As the number of voiceports in a given area increases, the distribution of voiceports to headend modems must be managed and redistributed to prevent an overload of the communication capacity of each headend modem. In some cases, modems will be added and in other cases voiceports will just be moved from overloaded modems to modems that have more capacity. This management process for redistributing the voiceports has been a very labor-intensive process requiring six or more man-hours a week in a communication system having multiple host digital terminals. The voiceport redistribution process requires a communication engineer to examine tables with up to a million entries looking out for voiceport congestion problems and looking for headend modems to redistribute voiceports to so as to reduce the congestion problems.

It is with regard to this problem and others related to the management of the voiceport distribution among the headend modems that the present invention has been made.

SUMMARY OF THE INVENTION

In accordance with the above and other problems, computer-implemented operations have been developed for assisting communication engineers in the redistribution of voiceports among headend modems at host digital terminals. In one aspect of the invention a system, managing communication capacity of a node served by a host digital terminal by redistributing communication lines among headend modems for the node in the host digital terminal, has a collect module, a voiceport list build module and voiceport redistribution module. The collect module collects and displays node and communication line usage data for the host digital terminal. Each node has a plurality of communication lines connected to one or more headend modems, and the communication lines are distributed among one or more voiceports. The voiceport list build module is responsive to a line distribution input for headend modems connected to the node served by the host digital terminal. The voiceport build module builds a voiceport redistribution list for redistributing the communication lines connected to the headend modems for the node. The voiceport redistribution module is responsive to the voiceport redistribution list and moves one or more voiceports from the voiceport's current headend modem to another headend modem whereby the communication lines for the node are redistributed among headend modems communicating with the node.

In another aspect of the invention a method, which redistributes lines among headend modems in a host digital terminal by redistributing voiceport assignments to the headend modems, comprises testing voiceport moves, identifying each verified-move voiceport, verifying voiceport moves and moving verified-move voiceports. The act of testing tests whether voiceport moves for a node served by the host digital terminal have been verified. If one or more voiceport moves have been verified, a verified-move voiceport is identified. If one or more voiceport moves have not been verified, a voiceport move is verified by executing a trial move of the voiceport and marshalling-in each trial-moved voiceport. If the trial-moved voiceport is not successfully marshalled-in, the trial-moved voiceport is returned to its original headend modem before the trial move. If the trial-moved voiceport is successfully marshaled-in, the voiceport move for the trial-moved voiceport is identified as a verified-move voiceport. Each verified-move voiceport is permanently moved to its new headend modem.

In another aspect of the invention, a user interface in a system for redistributing lines among headend modems displays a node list, receives a node select input, displays a communication history for the headend modems and receives line change input. A node list of communication nodes for one or more host digital terminals is displayed. The node list identifies those communication nodes having headend modems operating near a minimum channel limit. A node select input is received, and this input identifies a selected node on the node list. a communication history and number of lines between the selected node and the headend modem is displayed for each headend modem communicating with the selected node. Line change data input for one or more headend modems communicating with the selected node is received. The line change data indicates the number of lines communicating with the selected node that are to be added to or taken away from a headend modem.

The invention may be implemented as a computer process, a computing system or as an article of manufacture such as a computer program product or computer-readable media. The computer program product may be a computer storage media readable by a computer system and in coding a computer program instructions for executing a computer process. The computer program product may also be a propagated signal on a carrier where the signal is readable by a computing system and encodes a computer program of instructions for executing a computer process. The great utility and advantage of the invention is that the invention has reduced the redistribution process from an operation that takes several hours to an operation that can be accomplished in less than an hour and typically around 15 minutes.

These and various other features as well as advantages, which characterize the present invention, will be apparent from a reading of the following detailed description and a review of the associated drawings.

BRIEF DESCRIPTION OF THE DRAWINGS

FIG. 3 shows a user interface which would be used by a communication engineer to add headend modems and redistribute voiceports.

DETAILED DESCRIPTION OF PREFERRED EMBODIMENTS

The logical operations of the various embodiments of the present invention are implemented (1) as a sequence of computer implemented acts or program modules running on a computing system and/or (2) as interconnected machine logic circuits or circuit modules within the computing system. The implementation is a matter of choice dependent on the performance requirements of the computing system implementing the invention. Accordingly, the logical operations making up the embodiments of the present invention described herein are referred to variously as operations, structural devices, acts or modules. It will be recognized by one skilled in the art that these operations, structural devices, acts and modules may be implemented in software, in firmware, in special purpose digital logic, and any combination thereof without deviating from the spirit and scope of the present invention as recited within the claims attached hereto.

Figure 1:
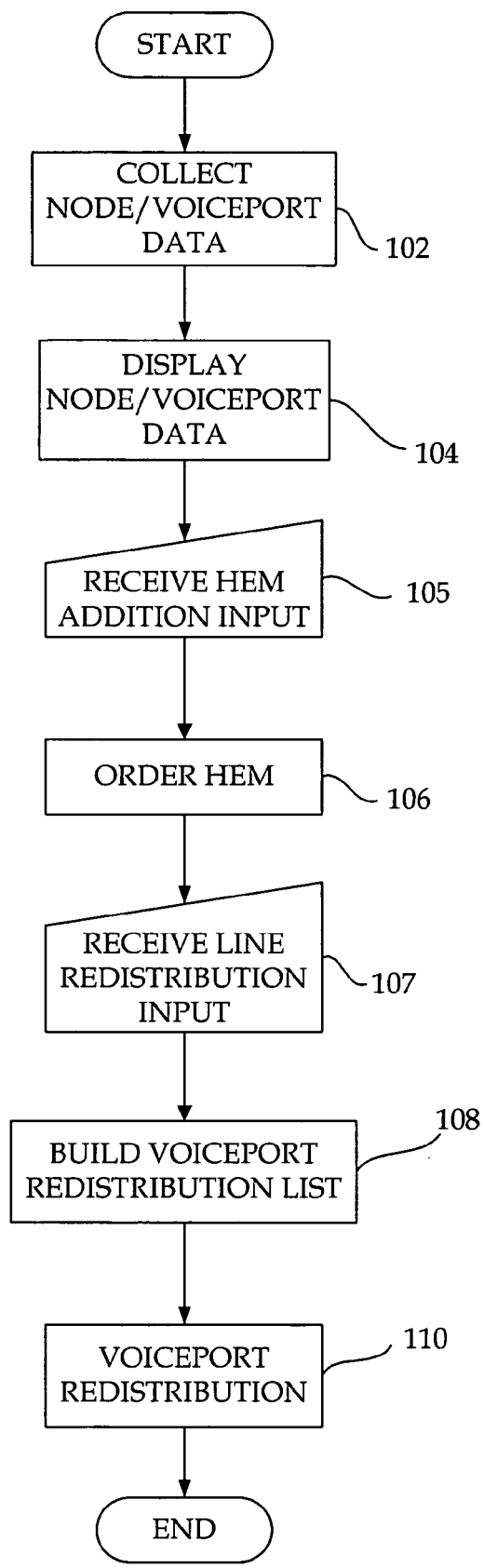
FIG. 1 shows the operational flow for operations for one preferred embodiment of the invention working with the user interface of FIG. 3 to add headend modems to a host digital terminal (HDT) and build voice port lists as in FIG. 4, and redistribute as shown in FIG. 6 the voiceports among headend modems at the HDT.

FIG. 1 illustrates the operational flow for one preferred embodiment of the invention. The operations begin at collect operation 102 which collects the node and voiceport network data. A node has multiple communication lines from one or more headend modems (HEMs), and each line may serve multiple voiceports as will be described shortly in reference to FIG. 2. Display operation 104 displays this node and voiceport network data for one or more nodes for analysis by a communication engineer. A communication engineer can review the data on the user interface in FIG. 3 and input recommendations to add a headend modem (HEM) to a host digital terminal (HDT). This HEM addition input is received by receive operation 105. In response to the HEM addition input, order operation 106 generates a job order for a technician to install one or more HEMs.

The communication engineer will also analyze the displayed node and voiceport data and add/redistribute the number of lines among the HEMs for a given node. This line redistribution input from the communication engineer is received by receive operation 107. Build operation 108 analyzes the number of lines associated with each voiceport and builds a voiceport redistribution list to accommodate the number of lines added and/or redistributed by the communication engineer.

Voiceport redistribute module 110 receives the voiceport build list, performs a trial redistribution for a voiceport. The redistribute module 110 verifies the voiceport move decisions as they are performed in the trial redistribution. If a problem develops in moving the voiceport, the voiceport trial-move is marked as failed, and the voiceport is not moved. The result of the voiceport redistribution module 110 is movement of voiceports, creation of a summary of the voiceport moves and a detail report on the voiceports.

Figure 2:
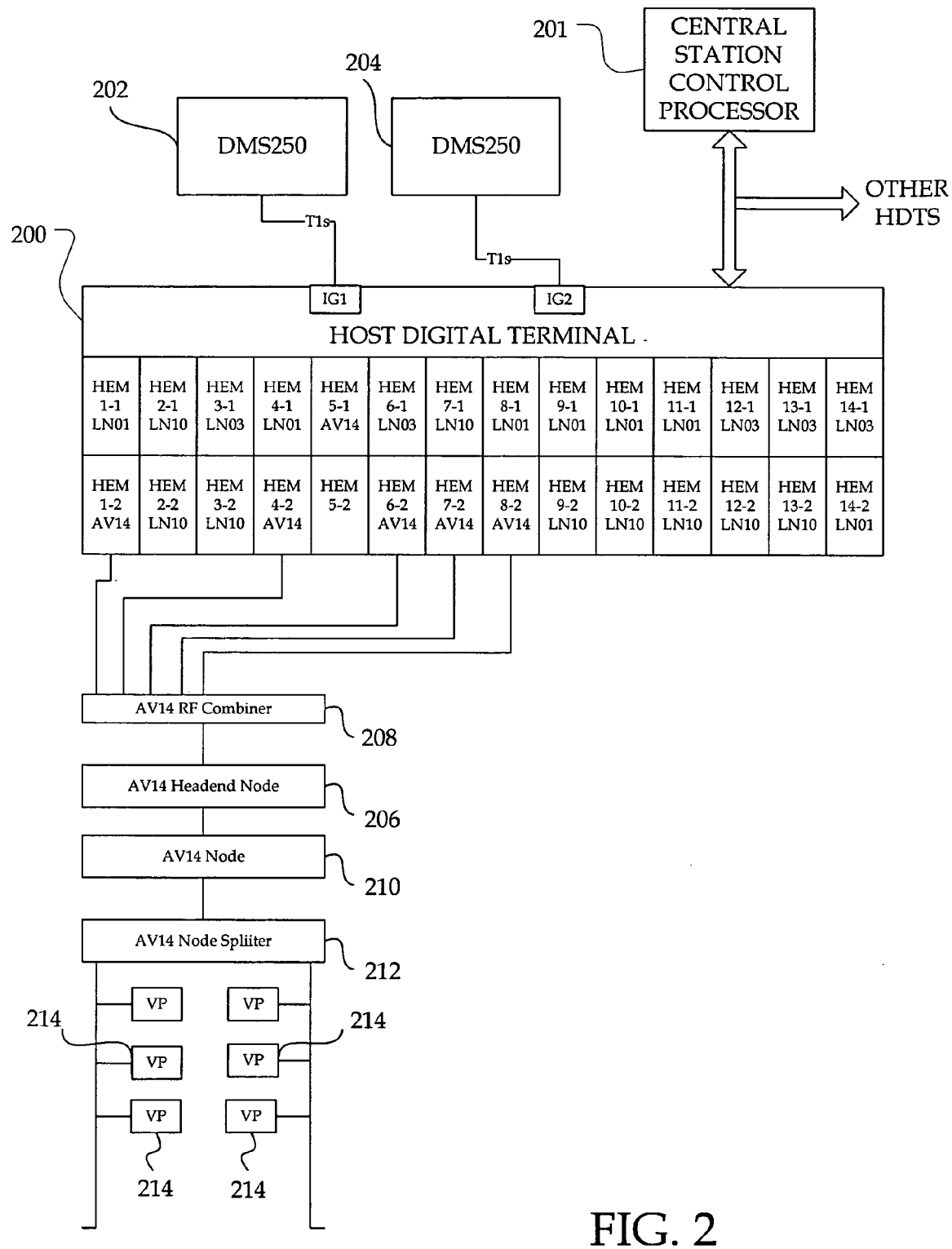
FIG. 2 shows a typical voiceport network for one host digital terminal (HDT) with its connection to the central station control computer for all HDTs at the central station.

FIG. 2 illustrates a typical voiceport network associated with a host digital terminal 200 controlled by a central station control computer 201. The host digital terminal 200 receives voice channels over "T1" communication lines from DMS250 telephone switches 202 and 204. The DMS250 telephone switch is available from Nortel Corporation. There are three to 11 T1 lines from each of the DMS250 switches to the host digital terminal 200. The T1 lines from DMS 202 are received at interface group 1 (IG1) at the host digital terminal 200, while the T1 lines from DMS 204 are received at interface group 2 (IG2) of the host digital terminal 200.

Each host digital terminal has 14 slots for receiving headend modem cards. Each headend modem card contains two headend modems. In FIG. 2, the first number associated with a headend modem indicates its slot number, and the second number indicates whether it is the first or second modem on the card. Accordingly, a host digital terminal can contain 28 headend modems.

The communication line from each headend modem goes to a headend node 206 through a node combiner 208. In the example in FIG. 2, the AV14 headend node 206 is communicating with five headend modems in the host digital terminal 200 through the combiner 208. The notation AV14 is simply a geographical notation for the headend node indicating, for example, a city and the number of the node within the city. The headend node 206, combiner 208 host digital terminal 200 and central station control computer 201 are all located at a central communication station or a hub site. The AV14 headend node 206 forwards the signals to an AV14 node 210 at a field site. At the field site, the signals are passed through a node splitter 212 where they are then sent on to each subscriber having a voiceport 214.

There usually will be a plurality of headend nodes served by each host digital terminal. In the example in FIG. 2, the host digital terminal supports headend nodes with the geographical identification of LN01, LN03, LN10 and AV14.

Each headend modem (HEM) can support 24 phone calls. Accordingly, since there are five AV14 HEMs connected to combiner 208, the AV14 node has a capacity of 120 phone calls. The system, on the other hand, may have anywhere from 200 to as many as 700 communication or phone lines connected to a node such as the AV14 node 210. If the number of phone calls on those lines exceeds the HEM capacity, twenty four phone calls, then the phone calls attempting to be made after the communication capacity is reached will be blocked. It is this blocking of phone calls that the communication engineer is trying to avoid by adding HEMs to the network and redistributing voiceports among the HEMs for a given node.

The central station control computer 201 is linked to HDT 200 and all other HDTs at the central station. Control computer 201 is the computer on which the computer process of the preferred embodiments of the invention is running. Control computer 201 would be a server computer communicating with the client computing systems within the host digital terminals. The control computer may be a personal computer, a mid-size computer, a main-frame computer or a server card in computing system. Control computer 201 will preferably include: a central processing unit, computer memory, data storage devices, a computer display device, keyboard input and cursor input devices, a printing device, and network communication devices.

Figure 3:
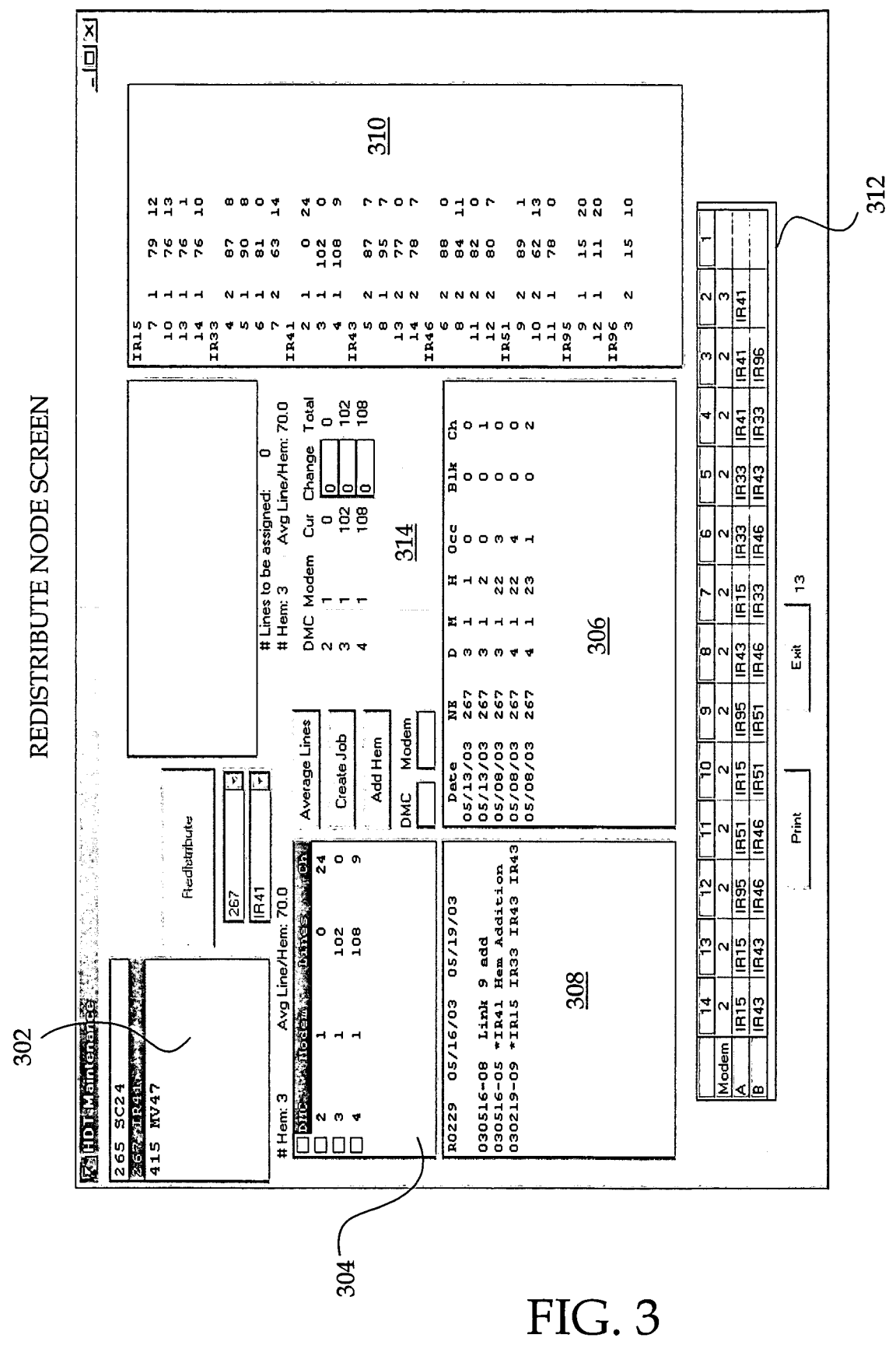

FIG. 3 shows a hypothetical example of a redistribute node screen where the collected network data is displayed to a communication engineer and where the engineer may enter data to change node and voiceport allocations to a HEM. The manner in which the engineer can use this user interface will be discussed shortly. For present purpose, the data displayed and data entered in the multiple windows of the redistribute node screen will be described.

Window 302 displays an exception list of nodes requiring maintenance. Each row in the list contains the node identification number and its host digital terminal identification number. For example, in the highlighted row of window 302, node #IR41 in host digital terminal #267 requires maintenance. The highlighting indicates that this is the node selected by an operator, the communication engineer, for node and voiceport redistribution. In this particular example of FIG. 3, there are three nodes on the exception list. The selected node with its identifiers appears also in the sub-windows located just outside of and at the lower right corner of window 302.

Window 304 provides more detailed information including communication line usage data regarding node #IR41. In window 304 there are four columns of information. The "DMC" column indicates the number of a dual modem card. Each dual modem card contains two HEMs. The "Modem" column indicates whether the HEM is the first or second modem on the card. The "Lines" column indicates the number of lines connected to the HEM, and the "Ch" column (Ch meaning Channels) indicates the HEM's minimum channel capacity for phone calls in a most recent time period such as the preceding day. Accordingly, the first row of data indicates that the headend modem in the second slot-first modem location of HDT267 has no lines attached to it and thus 24 channels of capacity were available throughout the recent time period. In the second row, the headend modem in the third slot-first modem location of HDT267 has 102 lines attached and at some point in the recent time period no channels were available. In other words, all 24 channels were busy with phone calls, and this HEM had no additional available communication capacity. In this situation phone calls are likely to be blocked. Lastly, in the third row of window 304, the HEM 4-1 of IR41 in HDT267 has 108 lines attached and at some point in the most recent time period its minimum channel capacity was reduced to nine channels available.

Window 306 on the redistribute node screen is a one-month log of communication line usage data for the headend modems of node #IR#41. The log indicates the date and time during the month when the maximum use was made of, or minimum number of channels were available for, each headend modem of node #IR41. In window 306, the host digital terminal and headend modem are identified by the NE column, D column and M column. For example, in the first row, the headend modem is HEM 3-1 in HDT267. The "H" column indicates the hour of the day when the lowest minimum channel event occurred. The "OCC" column indicates the average occupancy, i.e., average number of channels used at any one time during the hour. The "BLK" column indicates the number of channels or calls blocked during the hour. The "Ch" column indicates the minimum number of channels available at some time during the hour. Thus, interpreting the first row in window 306 in this hypothetical example, modem 3-1 of host digital terminal 267 during the hour from 1:00 a.m. to 2:00 a.m. on May 13th had an average channel occupancy of zero, no calls were blocked, and at some time during the hour the minimum number of channels available dropped to zero. Stated in another way, at some point during the hour, there was a high call rate resulting in all 24 channels being used but no call was blocked.

Window 308 of the redistribute node screen is a record of work orders performed on the host digital terminal 267 and redistributions in Node IR41. In this hypothetical example, these jobs were performed between May 16th and 19th. In the first row, on May 16th, a T1 link 9 was added between a DMS250 switch and the interface group of the host digital terminal. Also on May 16th, a work package to add a headend modem to the IR#41 node was created and emailed to the Transport Group. On February 19th, a job package was created in which a plurality of nodes were connected to the host digital terminal.

Window 310 is a summary of the nodes and their minimum channel condition over the recent time period. All of these nodes are attached to host digital terminal 267. The summary for each node indicates the headend modems that are serving the node, the number of lines connected to each headend modem, and the lowest minimum channel event that occurred for each headend modem. For example, IR15 has four HEMs 7-1, 10-1, 13-1 and 14-1. HEM 7-1 has 79 lines connected and in the measured time period the lowest number of minimum channels available was 12. The other headend modems attached to IR15 all have 76 lines connected to their modem and the lowest number of minimum channels during the time period was 13, 1 and 10, respectively.

Table 312 at the bottom of the redistribute node screen is a map of the headend modem slots in the host digital terminal. It is useful in that it displays the location of each headend modem in the host digital terminal and more importantly displays empty slots in the host digital terminal. As depicted in FIG. 3, the 267 host digital terminal has three empty headend modem positions. There are two headend modem positions available in slot 1 and one headend modem position in slot 2 location B. The row labeled modem in Table 312 merely indicates the model or version of the Dual Modem Card (DMC) installed in that particular slot.

At the center of the redistribute node screen in area 314, the communication engineer inputs the changes that he wishes to make. The "DMC" and "Modem" windows in lower left corner of area 314 are simply displaying the headend modem being worked on at a given time. For example, if the engineer were working on modem 2-1, then a 2 would appear in the DMC window and a 1 would appear in the Modem window.

Since node IR41 is being worked on, the data in table 304 is reproduced in area 314, but in addition, there is an input column of windows for inputting a "Change" in number of lines for each HEM. In this window, for each row, the communication engineer would enter the lines he wishes to add or subtract from a particular headend modem. For example, in the row for HEM 2-1, the engineer might add or enter +50 in the change column and for HEMs 3-1 and 4-1, he might enter −25. Alternatively, the engineer may simply select the "Average Lines" button on the screen, and the program will assign 70 lines to each of the headend modems. In other words the total number of lines previously allocated was 210—102 to HEM 3-1 and 108 to HEM 4-1. Averaging the lines results in each of the three HEMs being allocated 70 lines.

After the changes have been entered, the engineer selects the "Create Job" button on the screen, and the program will issue the job orders to the technicians to perform the tasks. If the communication engineer decides that an additional headend modem is required, an empty position in table 312 is selected. In other words, the communication engineer would use the cursor to select the slot position 2 in row B of table 312 for example. Next, the engineer would select the add HEM button on the node screen in area 314. This would cause the program to issue an email to technicians to add an additional headend modem as HEM 2-2.

Figure 4:
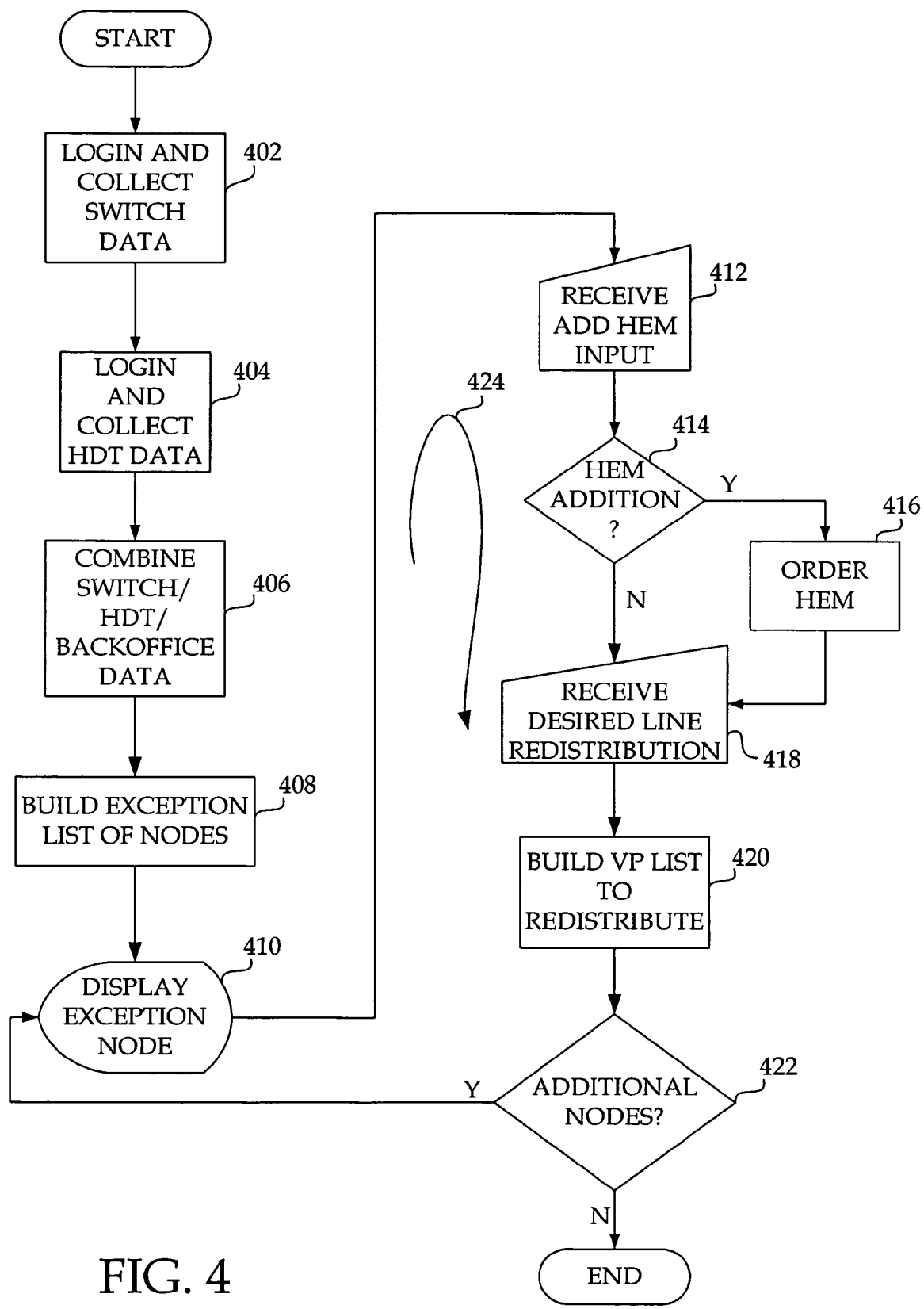
FIG. 4 is the operational flow for one preferred embodiment of collecting the network data, adding a headend modem (HEM), and building a voiceport redistribution list.

FIG. 4 illustrates the operational flow according to one preferred embodiment of the invention. The flow begins at collect switch data operation 402. Module 402 collects the switch data from tables for the DMS250 switches and includes telephone numbers and home reference values that are used in switching and tracking through the network.

Collect HDT data module 404 collects all of the data from the host digital terminals in the network. This data includes the headend modems in the host digital terminal, their slot location, each modem's node connection and the number of lines connected between each headend modem and its node. Each of the collect modules 402 and 404 log into the respective devices either DMS250 switches or host digital terminals. The data collected by collect modules 402 and 404 is placed into databases. The combine module 406 then combines the data collected in these databases and creates a more workable database composed of tables and associated listings. In effect, the combine module 406 creates a switch/HDT/back-office database containing all of the data necessary to support the redistribute node screen in FIG. 3.

Build operation 408 analyzes the database created by the combine module 406 looking for nodes that meet certain minimum channel conditions. These are the conditions that would trigger a need for work in redistributing voiceports connected to the node. In effect, the build operation 408 builds the exception list displayed in window 302 (FIG. 3) of the exemplary redistribute node screen. When the communication engineer selects one of these exception nodes with a cursor, the node is highlighted as in the case of HDT267-node IR41 in window 302 and the remainder of the windows in the redistribute node screen of FIG. 3 display data relating to node IR41 of HDT267 as described above in reference to FIG. 3.

The communication engineer will review this data and decide if it is necessary to add a headend modem (HEM) to the host digital terminal. As described earlier, if the communication engineer decides to add a headend modem, he selects an empty position in the table of headend modems 312 and then selects the add HEM button. Received add HEM input operation 412 receives the indication that the add HEM button was selected.

HEM addition test operation 414 detects whether or not an add HEM input was received. If there was no add HEM input, then the operation flow branches NO to desired line redistribution receive operation 418. However, if an add HEM input was received, then the operation flow branches YES to order HEM module 416. The order HEM module operational flow is shown in FIG. 5.

Figure 5:
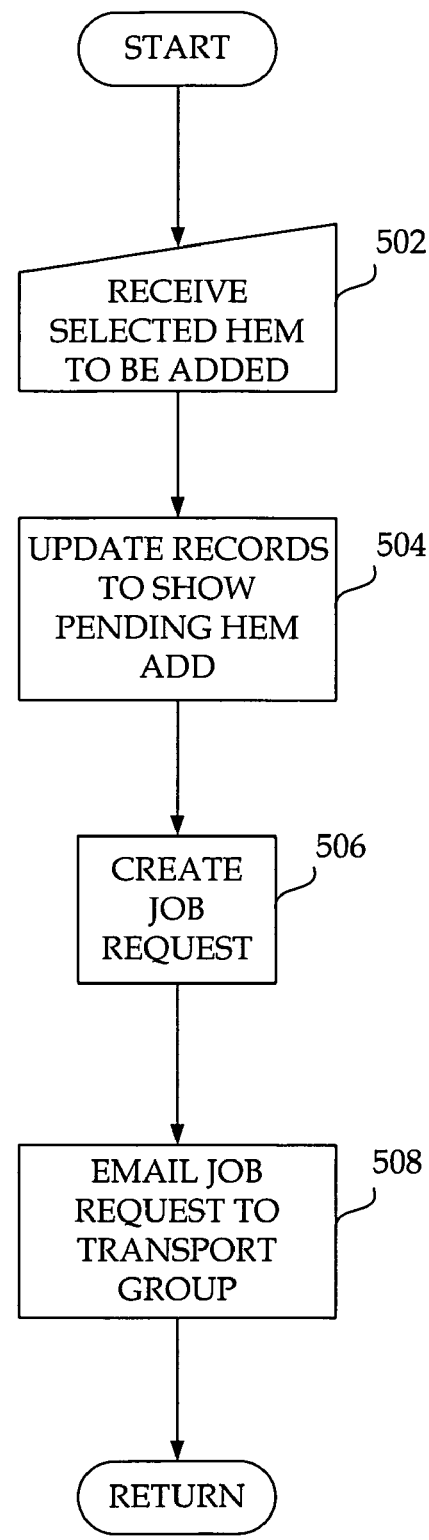
FIG. 5 shows the operational flow for the Order HEM operation 416 in FIG. 4.

In FIG. 5, the operational flow begins at receive operation 502 that receives information on the selected HEM to be added. The selected HEM information would include the slot and position for the HEM that is to be added and a node identification identifying the node with which this headend module will be working.

Update operation 504 then updates the databases to show the pending HEM addition. Create job request operation 506 creates the job order identifying the HEM and its location. This job request or job order for the HEM addition is then emailed in email operation 508 to the technicians in a transport group. These technicians are responsible for executing the requested job. In other words, they will physically add a modem or activate a modem, that is already in place, and connect it to the combiners for the node to which this additional HEM is assigned. After email operation 508 sends the job request, then the operational flow returns to receive operation 418 in FIG. 4.

Receive operation 418 is awaiting input from the communication engineer working with the redistribute node screen in FIG. 3. In particular, the receive operation 418 is awaiting the selection of the create job button by the communication engineer. The communication engineer first enters the desired number of line changes in the "Change" windows or selects the "Average Lines" button in area 314 as previously described in the description of FIG. 3. When all of the changes have been made on the screen, then the create job button is selected by the engineer. The line change data is then received in receive desired line redistribution operation 418 in FIG. 4.

Build VP list module 420 then builds the voiceport redistribution list implementing the line redistribution requested by the communication engineer. Module 420 includes at least a retrieve module and a create module. The retrieve module (not shown) retrieves from a database storing the node information the identifications of voiceports assigned to each headend modem serving the node and the total number of communication lines assigned to each voiceport (VP). The create module (not shown) creates the voiceport redistribution list identifying the voiceports that are to be moved and which headend modem they are being moved to. For example, assume the line change data indicates a first headend modem has a reduction of 25 lines and a second modem has an increase of 25 lines. The retrieve module retrieves data for the voiceports assigned to the first headend modem; the data includes VP1 with 10 lines, VP2 with 15 lines and VP3 with 20 lines. The create module will then list VP1 and VP2 to be redistributed from the first headend modem to the second headend modem. Of course, if the combination of lines for the voiceports to be moved does not exactly total the number of lines in the line change data, the create module will list voiceport redistributions getting as close as possible to the number of lines in the line change data.

Once this voiceport redistribution list is built, the operational flow then passes to additional nodes test operation 422 to detect whether there are additional nodes in the exception node list displayed in window 302 of FIG. 3. If there are additional nodes, the operational flow will branch yes and return to the display operation 410 awaiting the selection of the next node to be worked on by the communication engineer for redistribution. When the engineer selects the next node in the exception list in window 302, then the flow again proceeds through loop 424 as just described above. When all nodes on the exception list in window 302 have been adjusted, and their voiceport redistribution lists have been built, the operational flow will branch NO from additional nodes test 422. Program control returns to the main system program in the computing system.

Figure 6:
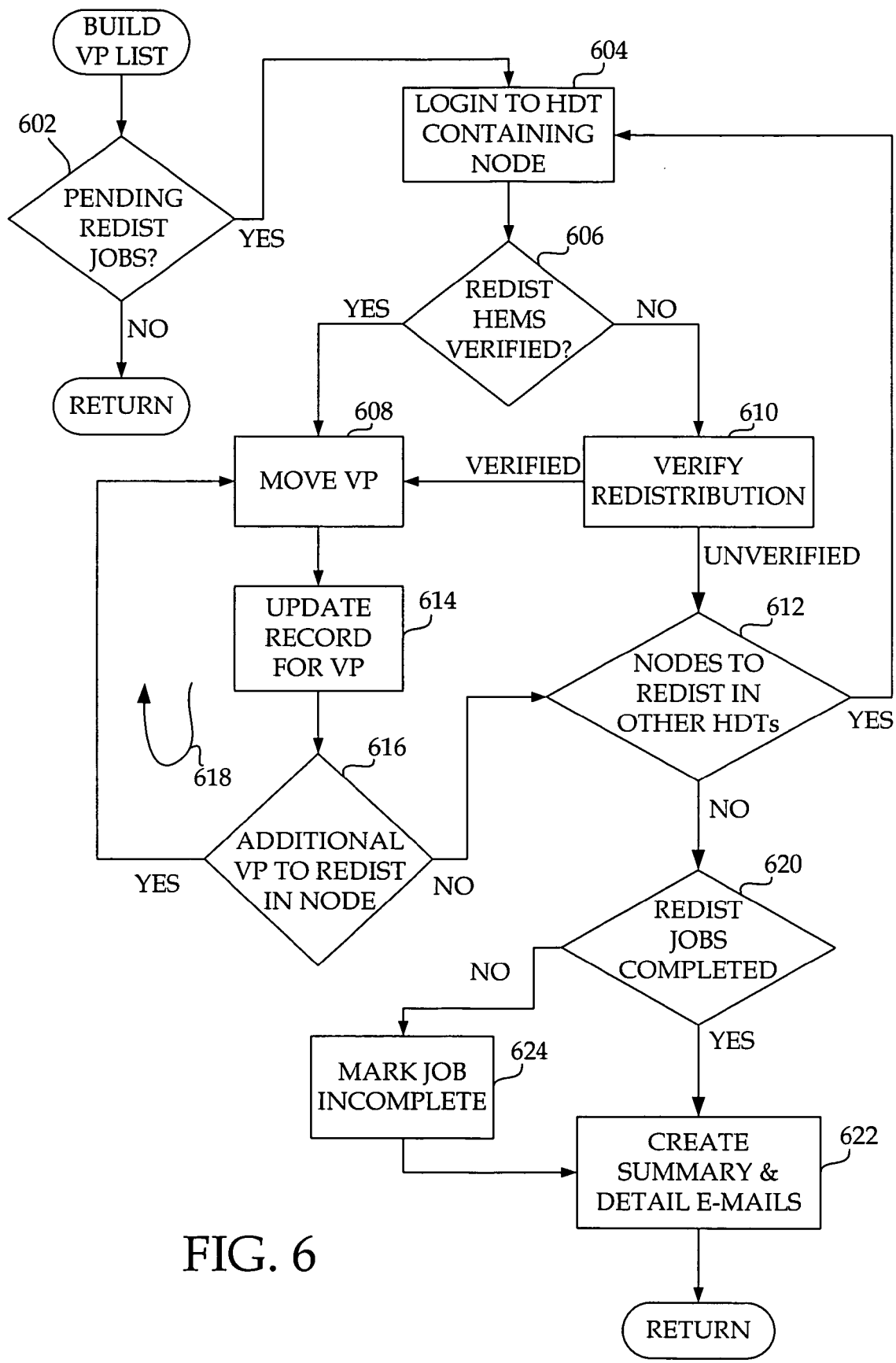
FIG. 6 illustrates the operational flow for operations in of the Voiceport Redistribution module 110 of FIG. 1.
Figure 7:
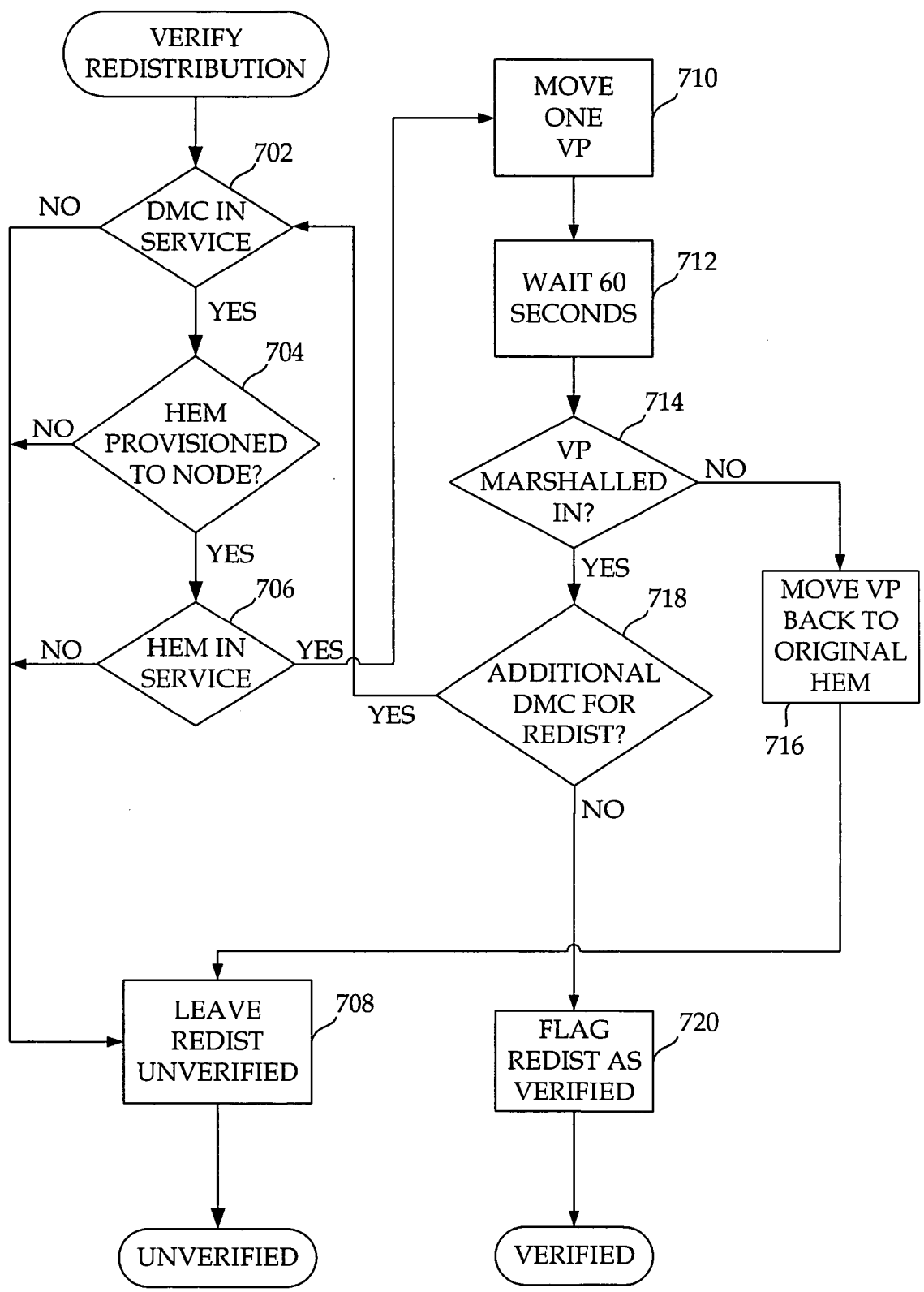
FIG. 7 shows the operational flow for the Verify Redistribution module 610 of FIG. 6.

FIG. 6 illustrates the operational flow for processing the voiceport redistribution list created by build module 420 in FIG. 4. In FIG. 6, the operational flow begins with pending redistribution jobs test operation 602. This test operation 602 detects the presence of pending jobs on the voiceport redistribution list and sequences the jobs based upon node and based upon HDT identification number. Login operation 604 then provides access to a host digital terminal containing nodes on the voiceport redistribution list. Once the central station control computer has access to the host digital terminal containing such nodes, HEMs redistribution verified test operation 606 tests whether each of the headend modems for a node in the HDT whose lines are to be changed will support voiceport changes to implement the line change. In other words, a potential change of voiceports is verified before the actual change is made. If the potential voiceport changes for HEMs in the HDT have been verified, the voiceports changed will be identified as verified-move voiceports. The operational flow will branch YES to move voiceport operation 608. If the potential voiceport changes have not been verified, then the operational flow will branch NO from test operation 606 to the verify redistribution module 610. One preferred embodiment of the verify redistribution module is illustrated in FIG. 7 which will be described hereinafter.

If the verify redistribution module 610 cannot verify the potential line changes, the line changes are marked as failed, and the operational flow passes to "Additional Nodes" test operation 612. Test operation 612 is detecting whether there are additional nodes in the jobs that are on the voiceport redistribution list.

If the potential voiceport changes have been verified by verify operation 610, i.e. a voiceport has been identified as verified-move, then the operational flow passes to move voiceport operation 608. The move voiceport operation permanently changes the assignment of the verified-move voiceport to a HEM which has the effect of moving the lines associated with that voiceport. Typically this is a transmission frequency reassignment for the voiceport. Update operation 614 then updates the record for the voiceport indicating it has a new headend modem (HEM) assignment.

Additional voiceports test operation 616 detects whether there are additional voiceports to be redistributed for the node currently being processed. Usually there will be more than one voiceport to be moved to accomplish the desired change in the number of lines attached to a given HEM. A voiceport will have anywhere from two to 24 lines. Typically, the number of lines per voiceport is about five.

If additional voiceports need to be moved, then the operation flow branches back to move voiceport operation 608. Loop 618 will continue until all voiceports to be moved for the node being processed in the HDT currently accessed have been moved and the records updated. Once all of the voiceports for the node in the HDT have been moved to accomplish the line redistribution, the operation flow will branch NO to additional nodes test operation 612. If there are additional nodes with voiceports on the voiceport redistribution list, the operational flow branches YES to same HDT test operation 619. Same HDT test operation 619 detects whether the next node having voiceports on the voiceport redistribution list is a node in the same HDT. If it is, the operation flow branches to HEMS verified test operation 606. If it is not, the operation flow branches to login operation 604. Login operation 604 gains access to the next HDT (host digital terminal) with the nodes having voiceports requiring redistribution. The redistribution process in FIG. 6 is performed for the next HDT as described above.

If all nodes to be redistributed for all of the HDTs on the voiceport redistribution list have been processed, the operational flow will branch NO from test operation 612 to redistribute jobs completed test operation 620. When all of the redistribution jobs have been successfully completed, the operation flow will branch YES to create e-mails operation 622. There will be a summary e-mail created identifying the jobs completed, and a detail e-mail created identifying the lines that have been moved. In the event some of the redistribution jobs failed, then the operation flow branches no from test 620 to mark job incomplete operation 624. Mark job incomplete operation 624 marks those voiceport redistribution jobs that failed or those jobs that have not otherwise been completed. Create operation 622 then creates e-mails summarizing not only the completed jobs but the incomplete or failed jobs.

FIG. 7 illustrates the verify redistribution operational flow that occurs in the verify redistribution module 610 in FIG. 6. The operational flow in FIG. 7 begins with three test operations. DMC (dual modem card) in service test operation 702 detects whether the modem card having line changes is in service and thus can be changed. HEM provision test operation 704 detects whether the headend modem to be provisioned for implementing the changes has been provisioned. In other words, is the headend modem, where changes are to be made, installed in the host digital terminal. HEM in service test operation 706 detects whether the headend modem, on which line changes are to be made, is in service, i.e. is currently operative. If all three of the above tests are successfully passed, there is a high probability that a voiceport may be moved to that HEM in the HEM's digital modem card. On the other hand, if any one of the three test operations 702, 704, 706 fail for any of the DMC or HEMs in the Node, then the operation flow will branch to leave redistribution unverified operation 708. Leave unverified operation 708 will mark the redistribution for this node as unverified and no changes will be made for this node.

When all three test operations 702, 704, 706 are successfully passed, then move one voiceport operation 710 executes a trial move of one voiceport for this HEM in the redistribution process. Once the move is made, the operations wait for 60 seconds or a sufficient amount of time for the new communication for the trial-moved voiceport to come online. After a wait operation 712, voiceport-marshaled-in test operation 714 tests whether the trial-moved voiceport is operating successfully at its new headend modem. If the trial-moved voiceport is not operating properly, then the operational flow branches NO to return the voiceport back operation 716. Return operation 716 moves the voiceport back to its original headend modem assignment where it was operating successfully. Since this potential move failed, the operation flow passes to leave operation 708. Leave operation 708 leaves the redistribution for this headend modem as unverified and marks the unverified condition and returns the flow to test operation 612 in FIG. 6.

If the single voiceport trial-move operation has been successful as detected by voiceport-marshaled-in test operation 714, the test operation marks the voiceport as verified-move. The operational flow branches YES from test operation 714 to additional voiceport test operation 717. Test operation 717 is detecting whether there are additional voiceports for the HEM being currently processed to accomplish the redistribution of lines attached to the modem. If there are more voiceports to be moved for the HEM, the operation flow branches YES and returns to move one VP operation 710, and the next move operation is processed. When all voiceports for the HEM have been moved, the operational flow will branch NO to additional DMC test operation 718.

Additional DMC test operation 718 is detecting whether there are additional dual modem cards for the node being currently processed that require redistribution of lines attached to their modem. For efficiency of operation, it is preferred that all dual modem cards having HEMs with line redistributions for the same node have their verifications performed in one process. If there are such additional DMCs having redistribution, the operational flow branches YES and returns to the three test operations 702, 704 and 706 as shown in FIG. 7. If there are no additional dual modem cards a part of the redistribution process, then the operation flow branches NO to flag verified operation 720. Flag verified operation 720 marks the redistribution of the voiceport as successful and the operational flow returns to move voiceport operation 608 in FIG. 6. Move voiceport operation 608 makes the permanent voiceport moves.

While the invention has been particularly shown and described with reference to preferred embodiments thereof, it

What is claimed is:

1. A method for redistributing lines among a plurality of headend modems in a host digital terminal by redistributing voiceport assignments to the headend modems, the method comprising:
   testing, by a computer, whether at least one voiceport move for a node served by the host digital terminal have been verified;
   if the at least one voiceport move has been verified, indicating each verified-move voiceport; and
   if the at least one voiceport move has not been verified, verifying the at least one voiceport move by:
      executing a trial move of at least one associated voiceport;
      marshalling-in the at least one trial-moved voiceport;
      if the at least one trial-moved voiceport is not successfully marshalled-in, returning the trial-moved voiceport to each original headend modem;
      if the at least one trial-moved voiceport is successfully marshaled-in, indicating the voiceport move for the trial-moved voiceport is a verified-moved voiceport; and
      moving an assignment of the at least one verified-moved voiceport to its new headend modem.

2. The method of claim 1 further comprising:
   receiving desired line redistribution input, the redistribution input indicating a number of lines to be connected to each headend modem; and
   building a voiceport redistribution list, each voiceport having a predetermined number of communication lines serving the voiceport whereby moving the voiceport from a first headend modem to a second headend modem will move all of the communication lines serving the voiceport to the second headend modem.

3. The method of claim 2 further comprising:
   receiving add-headend-modem input, the add input indicating an additional headend modem in the host digital terminal is added to serve the node; and
   creating an order to order the installation of an additional headend modem.

4. The method of claim 1 further comprising:
   accessing the host digital terminal serving at least one node having pending voiceport redistributions;
   after all voiceport moves have been completed for a first node served by the host digital terminal, testing whether another node served by the host digital terminal has pending voiceport redistributions.

5. The method of claim 1, wherein moving the at least one verified-moved voiceport to its new headend modem comprises reassigning a transmission frequency for the at least one voiceport.

6. A non-transitory computer-readable medium which stores a set of instructions which when executed performs a method for redistributing lines among a plurality of headend modems in a host digital terminal by redistributing voiceport assignments to the headend modems, the method executed by the set of instructions comprising:
   testing whether at least one voiceport move for a node served by the host digital terminal have been verified;
   if the at least one voiceport move has been verified, indicating each verified-move voiceport; and
   if the at least one voiceport move has not been verified, verifying the at least one voiceport move by:
      executing a trial move of at least one associated voiceport;
      marshalling-in the at least one trial-moved voiceport;
      if the at least one trial-moved voiceport is not successfully marshalled-in, returning the trial-moved voiceport to each original headend modem;
      if the at least one trial-moved voiceport is successfully marshaled-in, indicating the voiceport move for the trial-moved voiceport is a verified-moved voiceport; and
      moving an assignment of the at least one verified-moved voiceport to its new headend modem.

7. The non-transitory computer-readable medium of claim 6 further comprising:
   receiving desired line redistribution input, the redistribution input indicating a number of lines to be connected to each headend modem; and
   building a voiceport redistribution list, each voiceport having a predetermined number of communication lines serving the voiceport whereby moving the voiceport from a first headend modem to a second headend modem will move all of the communication lines serving the voiceport to the second headend modem.

8. The non-transitory computer-readable storage medium of claim 7 further comprising:
   receiving add-headend-modem input, the add input indicating an additional headend modem in the host digital terminal is added to serve the node; and
   creating an order to order the installation of an additional headend modem.

9. The non-transitory computer-readable medium of claim 6 further comprising:
   accessing the host digital terminal serving at least one node having pending voiceport redistributions; and
   after all voiceport moves have been completed for a first node served by the host digital terminal, testing whether another node served by the host digital terminal has pending voiceport redistributions.

10. The non-transitory computer-readable medium of claim 6, wherein moving the at least one verified-moved voiceport to its new headend modem comprises reassigning a transmission frequency for the at least one voiceport.

11. A system for managing communication capacity of a node served by a host digital terminal by redistributing communication lines among headend modems for the node in the host digital terminal, the system comprising:
   a memory storage; and
   a processing unit coupled to the memory storage, wherein the processing unit is operative to:
      test whether at least one voiceport move for a node served by the host digital terminal have been verified;
      if the at least one voiceport move has been verified, indicate each verified-move voiceport; and
      if the at least one voiceport move has not been verified:
         execute a trial move of at least one associated voiceport;
         marshall-in the at least one trial-moved voiceport;
         if the at least one trial-moved voiceport is not successfully marshalled-in, return the trial-moved voiceport to each original headend modem;
         if the at least one trial-moved voiceport is successfully marshaled-in, indicate the voiceport move for the trial-moved voiceport is a verified-moved voiceport; and
      move an assignment of the at least one verified-moved voiceport to its new headend modem.

12. The system of claim 11, wherein the processing unit is further operative to:

receive desired line redistribution input, the redistribution input indicating a number of lines to be connected to each headend modem; and build a voiceport redistribution list, each voiceport having a predetermined number of communication lines serving the voiceport whereby moving the voiceport from a first headend modem to a second headend modem will move all of the communication lines serving the voiceport to the second headend modem.

13. The system of claim 12, wherein the processing unit is further operative to:

receive add-headend-modem input, the add input indicating an additional headend modem in the host digital terminal is added to serve the node; and create order to order the installation of an additional headend modem.

14. The system of claim 11, wherein the processing unit is further operative to:

access the host digital terminal serving at least one node having pending voiceport redistributions;

after all voiceport moves have been completed for a first node served by the host digital terminal, testing whether another node served by the host digital terminal has pending voiceport redistributions.

* * * * *